W. B. MURRAY.
PRESSURE OPERATED AND ELECTRICALLY CONTROLLED TRAIN CONTROL SYSTEM.
APPLICATION FILED JUNE 4, 1914.
1,265,943.
Patented May 14, 1918.
6 SHEETS—SHEET 1.
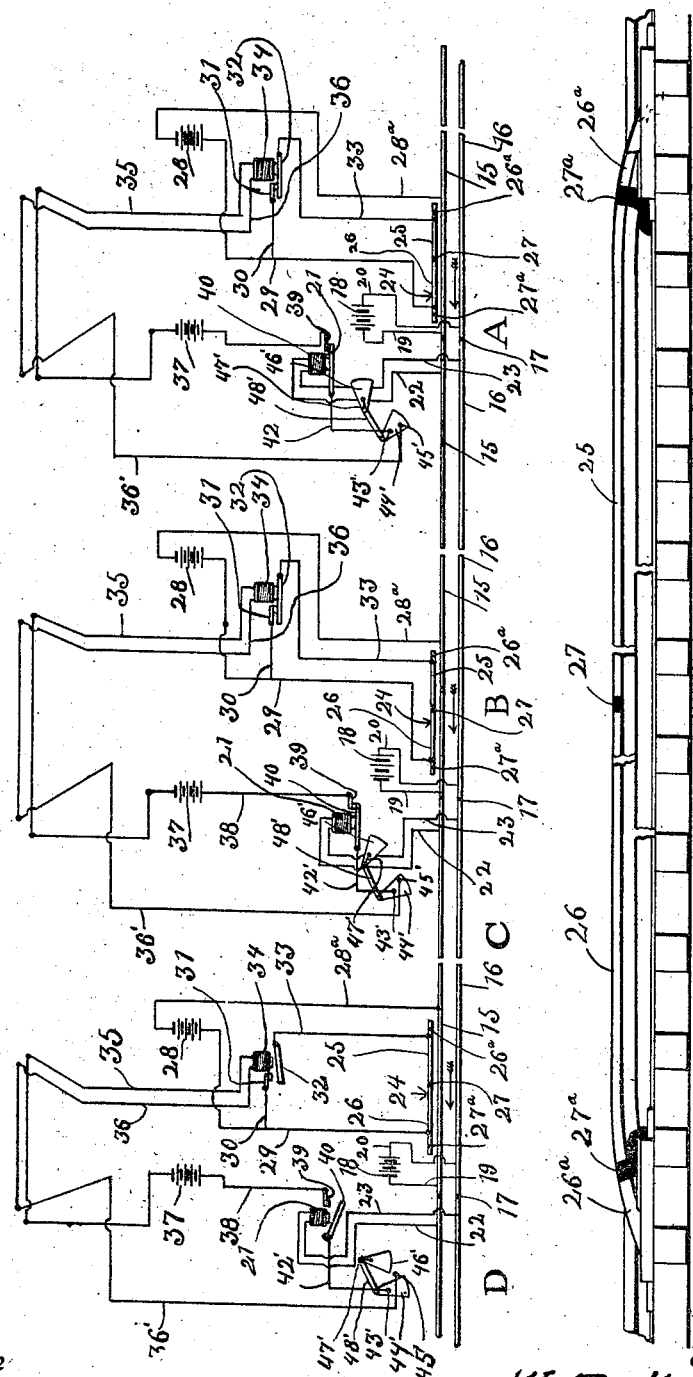

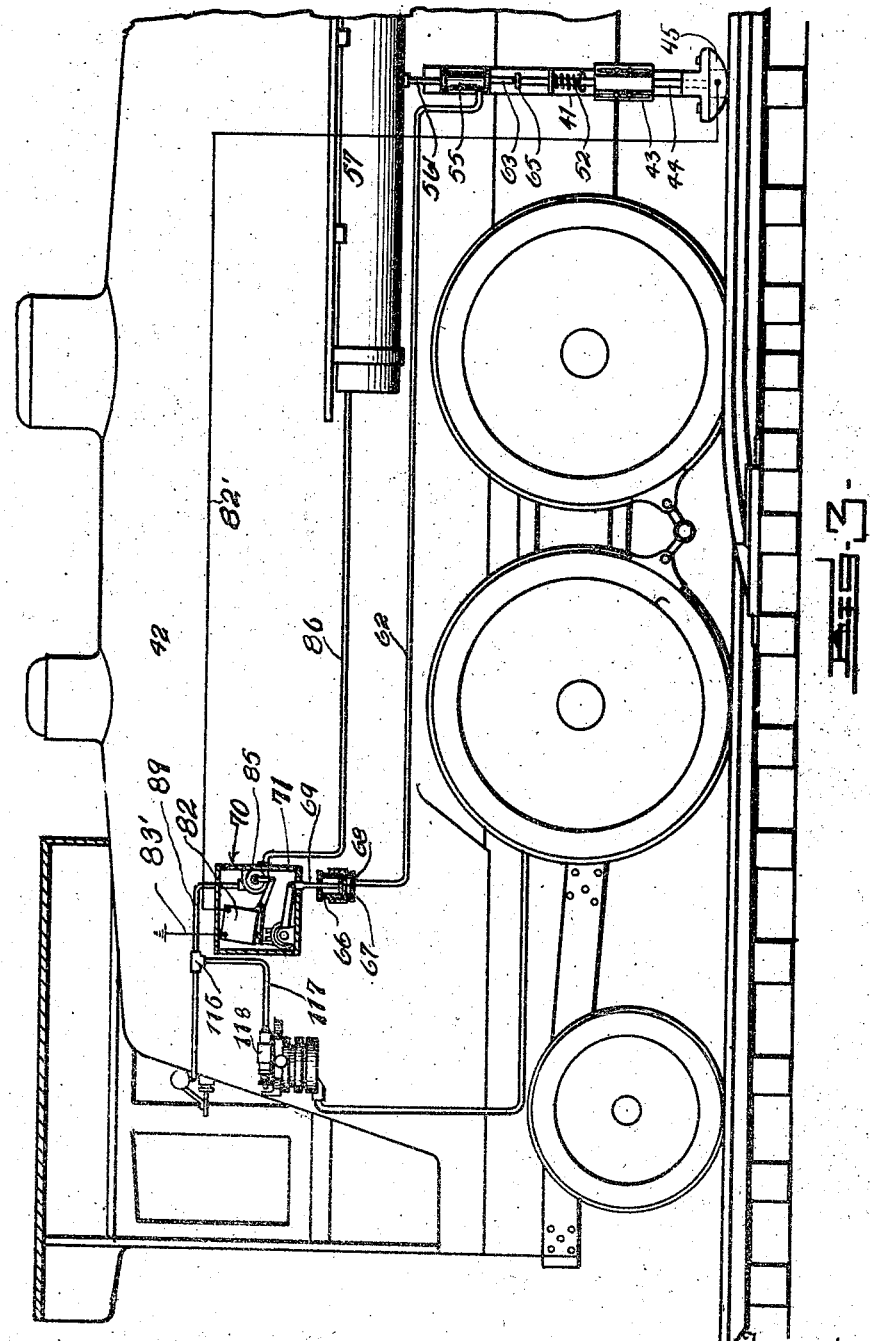

W. B. MURRAY.
PRESSURE OPERATED AND ELECTRICALLY CONTROLLED TRAIN CONTROL SYSTEM.
APPLICATION FILED JUNE 4, 1914.
1,265,943.
Patented May 14, 1918.
6 SHEETS—SHEET 3.
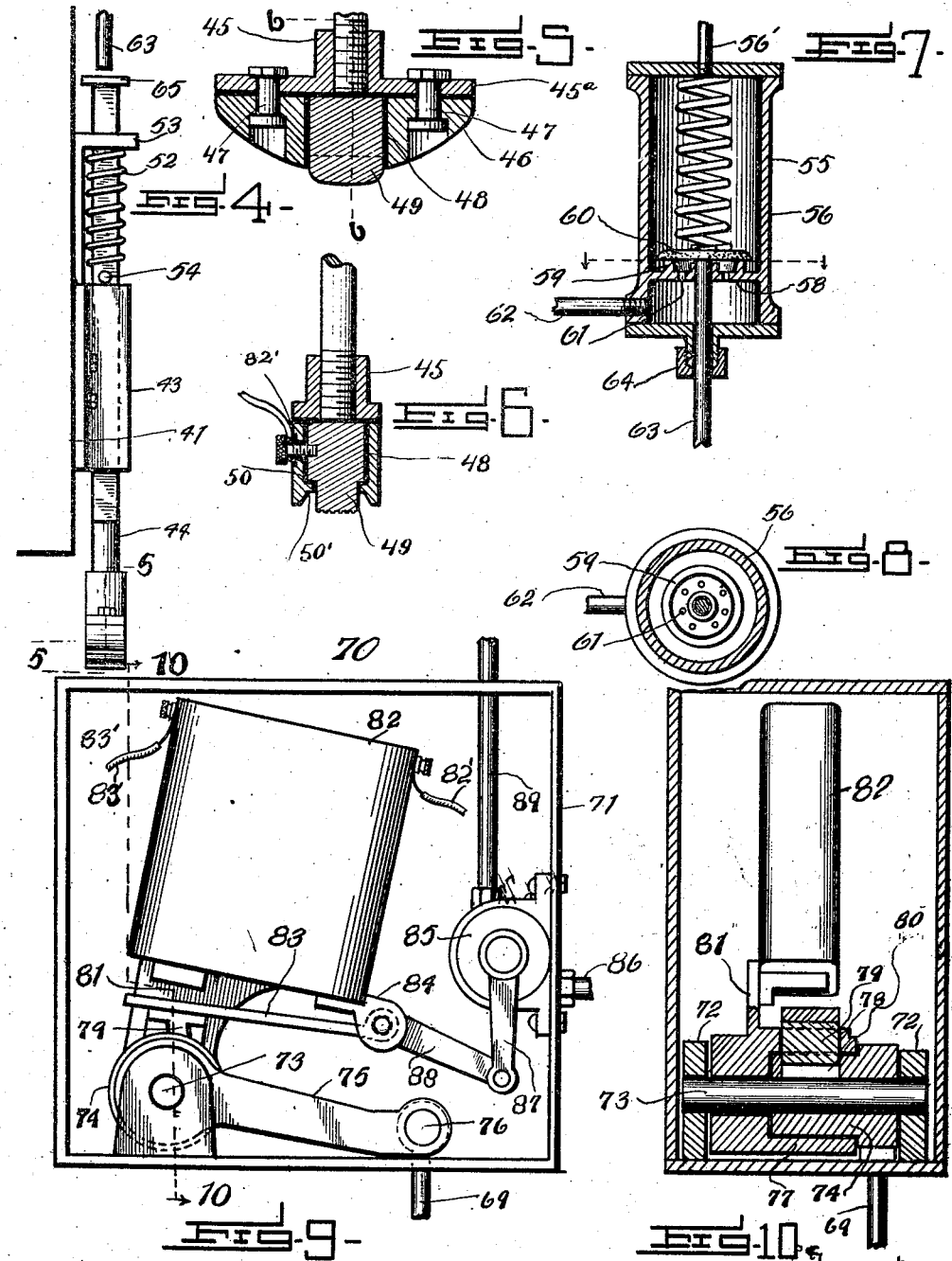
Witnesses
Inventor
W. B. Murray,
By
C. L. Parker
Attorneys

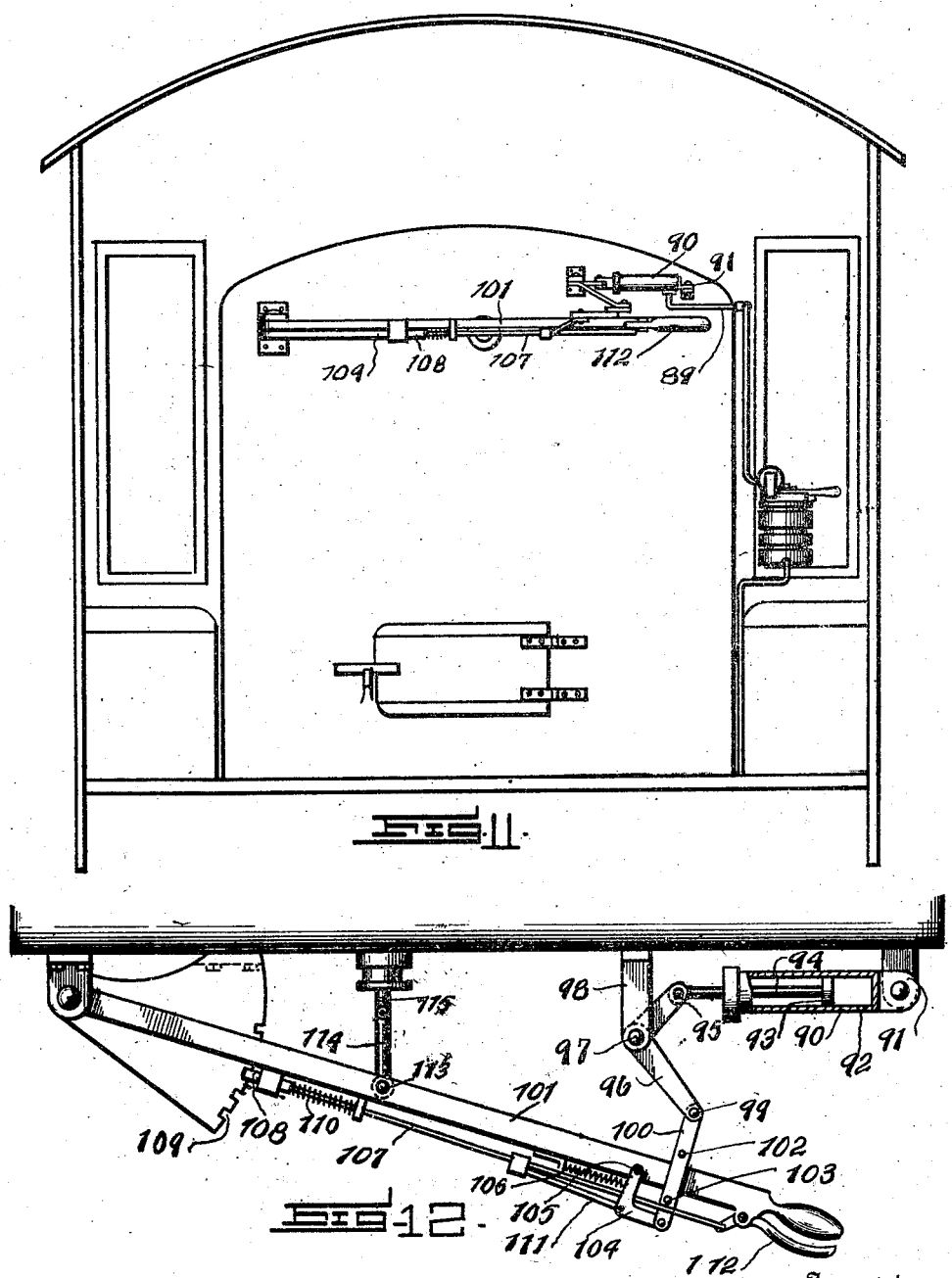

W. B. MURRAY.
PRESSURE OPERATED AND ELECTRICALLY CONTROLLED TRAIN CONTROL SYSTEM.
APPLICATION FILED JUNE 4, 1914.
1,265,943.
Patented May 14, 1918.
6 SHEETS—SHEET 6.
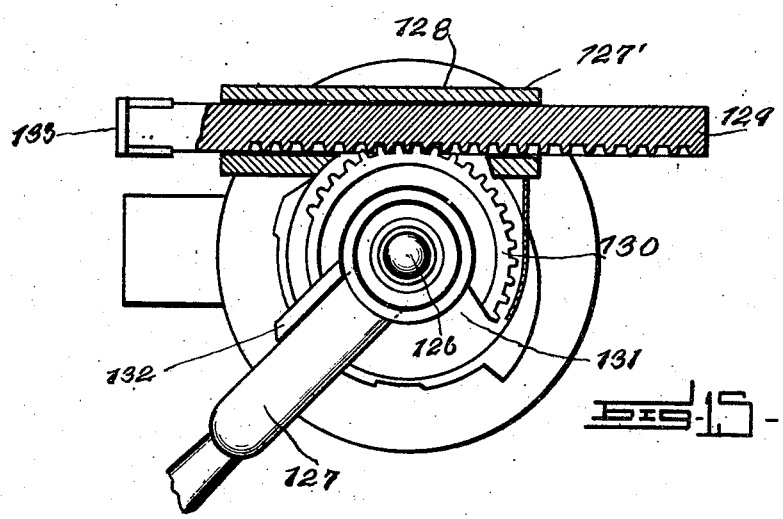
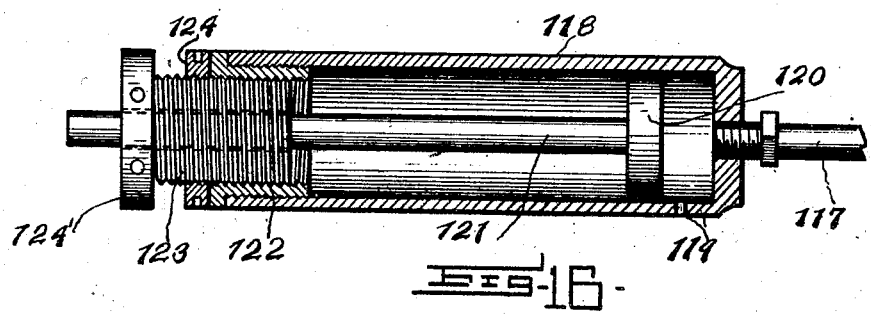

UNITED STATES PATENT OFFICE.

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

PRESSURE-OPERATED AND ELECTRICALLY-CONTROLLED TRAIN-CONTROL SYSTEM.

1,265,943.   Specification of Letters Patent.   Patented May 14, 1918.

Application filed June 4, 1914. Serial No. 842,896.

*To all whom it may concern:*

Be it known that I, WILLIAM B. MURRAY, a citizen of the United States, residing at Danville, in the county of Vermilion and State of Illinois, have invented certain new and useful Improvements in Pressure-Operated and Electrically-Controlled Train-Control Systems, of which the following is a specification.

This invention relates to improvements in train control systems of the general type wherein the track is divided into blocks of suitable length, there being a ramp or ramps to guard the entrance end of each block, serving to actuate train stopping means, carried by the locomotive, car or other vehicle, traveling thereon, and has particular reference to means of this character wherein the train stopping means is actuated by pressure operated means, there being electrically operated means to render the pressure operated means operative and inoperative with respect to actuating the train stopping means, the pressure operated means being in turn actuated by mechanically operated means moved by engagement with the ramp or ramps.

An important object of the invention is to provide apparatus of the above mentioned character, which is simple in construction, inexpensive to manufacture, easy to install upon almost any form of locomotive, car or other vehicle, and reliable in operation.

Other objects and advantages of the invention will be apparent during the course of the following description.

In the accompanying drawings forming a part of this specification and in which like numerals are employed to designate like parts throughout the same, Figure 1 is a diagrammatic view of track circuits and associated elements.

Figure 13:
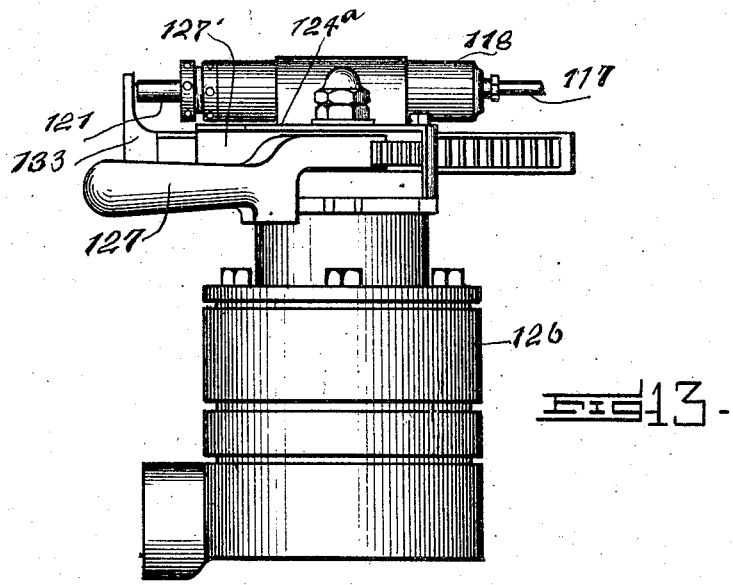
Figure 14:
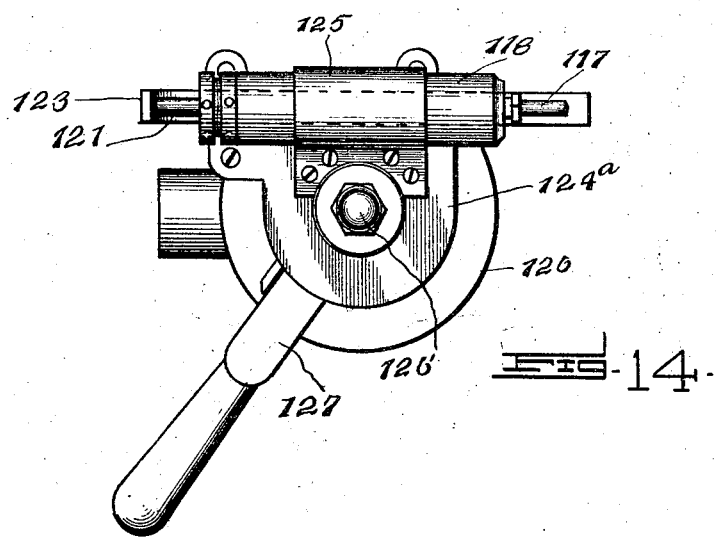

Fig. 2 is an enlarged side elevation of one of the ramps included in the invention, Fig. 3 is a side elevation of the rear portion of a locomotive, showing my apparatus arranged thereon, Fig. 4 is an edge elevation of a reciprocatory shoe carrying element or bar, included in the apparatus carried by the locomotive, Fig. 5 is an enlarged detail section taken on line 5—5 of Fig. 4, Fig. 6 is a cross-sectional view taken on line 6—6 of Fig. 5, Fig. 7 is a central longitudinal sectional view taken through a primary valve structure, included in the apparatus, Fig. 8 is a horizontal sectional view taken on line 8—8 of Fig. 7, Fig. 9 is a side elevation of electrically operated means for rendering the pressure operated means operative and inoperative with respect to actuating the train stopping means, Fig. 10 is a transverse sectional view taken on line 10—10 of Fig. 9, Fig. 11 is a side elevation, in the engine cab, of the throttle lever and engineer's brake valve operating means, Fig. 12 is a plan view of the throttle lever operating means, Fig. 13 is a side elevation of an engineer's air brake valve, with my actuating means therefor, Fig. 14 is a plan view of the same, Fig. 15 is a similar view with the rackbar and associated elements in section, and, Fig. 16 is a longitudinal section through the cylinder containing the rack-bar actuating piston.

Attention being called first to Fig. 1, the numerals 15 and 16 designate traffic rails, insulated at intervals, as shown at 17, for providing blocks A, B, C, and D, of suitable length. The traffic upon the track is in one direction, as indicated by the arrows.

Each block is provided with a local track circuit, comprising a source of current 18, preferably arranged near the exit end thereof, as shown. This source of current has one pole thereof connected with a wire 19, which is connected with the traffic rail 15. The opposite pole of the source of current is connected with a wire 20 having connection with the traffic rail 16. Arranged preferably near the entrance end of each block is an electro magnet or electrically operated device 21, having one end of its winding connected with the traffic rail 15 by means of a wire 22, the opposite end of such winding being connected with the traffic rail 16 through the medium of a wire 23. The electro-magnet 21 is included in a relay for controlling the electrical connection between a ramp and a source of current, as will be explained.

Arranged suitably in advance of the entrance end of each block is a ramp 24, preferably arranged outwardly of and near the traffic rail 15. This ramp 24 is curved longitudinally upwardly and is held stationary in its operative position by any suitable means. Each ramp comprises ramp-sections 25 and 26 arranged in end to end relation, rigidly connected, and thoroughly insulated from each other, as shown at 27. Each ramp-section 25 and 26 is provided at its ends with extensions 26ª, insulated therefrom at 27ª, the ramp-sections 25 and 26 being also thoroughly insulated from the ground.

Arranged preferably near the exit end of each block is a source of current 28, having one of its poles electrically connected with the traffic rail 15 of the same block, by a wire 28ª, as shown. The opposite pole of this source of current is connected with a wire 29, which is permanently electrically connected with the ramp-section 26, whereby the ramp-section 26 has permanent electrical connection with the source of current 28, for a purpose to be more fully explained. Connected with the wire 29 is a wire 30, having a stationary contact point 31 connected therewith, as shown. Adapted to engage and disengage this stationary contact point is a pivoted contact-armature 32, connected with a wire 33, in turn connected with the ramp-section 25. Arranged near the contact-armature 32 is an electro-magnet 34, one end of its winding being connected with a wire 35 and the opposite end of such winding with a wire 36. When the electro-magnet 34 is energized, the contact-armature 32 is swung upwardly into engagement with contact point 31, but when the electro-magnet is deënergized the contact-armature 32 automatically drops to disengage the stationary contact point 31. It is thus seen that when the contact-armature 32 engages the contact point 31, the ramp-section 25 will have electrical connection with the source of current 28 but that this electrical connection will be broken when contact-armature 32 disengages contact point 31. The wire 35 is electrically connected with one pole of a source of current 37, the opposite pole of which is connected with a wire 38. The wire 38 is connected with a stationary contact point 39, adapted to be engaged and disengaged by a pivoted contact-armature 40, as shown. This contact-armature is moved upwardly into engagement with the contact point 39 when the relay electro-magnet 21 of the track circuit in the next block ahead, is energized, but automatically drops to disengage the contact point 39 when this electro-magnet is deënergized. The contact-armature 40 is connected with a wire 42', connected with a contact-pivot 43' of a vertically swinging contact segment 44'. The numeral 45' designates a relatively stationary contact adapted to engage and disengage the contact segment 44', the stationary contact 45' being connected with the wire 36', as shown.

Arranged suitably near the entrance end of each block is a vertically swinging semaphore paddle 46', pivoted at 47'. Each semaphore paddle has a crank or extension connected with a crank or extension of the contact segment 44' arranged adjacent the same, by a rod 48' or the like. Each semaphore paddle is adapted to assume three positions, to wit, an uppermost position for indicating a clear block, an intermediate position for indicating caution condition, and a lowermost position for indicating danger or stop position. Any suitable means may be employed to shift or move the semaphore paddle, the same forming no part of my invention, for which reason it is thought unnecessary to show them. For the sake of illustration, I have shown the block B as being clear, block C as being at caution condition, and block D at danger condition, the semaphore paddles 46' assuming the three positions for indicating the block conditions, as above explained. When the semaphore paddle 46' is in the uppermost position, contact segment 44' engages stationary contact 45', as clearly shown in block B; when the semaphore paddle is in the intermediate position, contact segment 44' engages contact 45' as shown in block C; and when the semaphore paddle is in the lowermost position, contact segment 44' disengages contact 45', as clearly shown in block D.

As more clearly shown in Figs. 3 and 4, the numeral 41 designates a preferably vertically arranged support, rigidly attached to the frame work of a locomotive 42, preferably near the longitudinal center of the boiler or somewhat in advance thereof. The lower portion of this support 41 is provided with a tubular guide or casing 43, receiving a reciprocatory element or bar 44 preferably formed square in cross-section. The lower end of the bar is preferably formed cylindrical, for having screw-threaded engagement with a tubular extension 45 of the upper portion 45ª of a contact carrying shoe. The numeral 46 designates the lower portion of the contact carrying shoe, which is formed separate therefrom and secured thereto by bolts 47 or the like. The shoe portion 46 is insulated from the portion 45ª. The lower portion 46 is provided with a recess 48, receiving a contact 49, having shoulders 50, engaged by flanges 50'. The contact 49 is thoroughly insulated from the shoe portions and from the bar 44, as shown. The contact 49 preferably has its ends rounded and extends outwardly beyond the shoe portion 46, as shown. The reciprocatory element or bar 44 is moved or urged downwardly by a compressible coil spring 52, surrounding the same, and engaging at its upper end an apertured fixed arm 53, and at its lower end, a stop pin 54, carried by the bar or element 44, and engaging the upper end of the tubular guide 43, to positively limit the downward movement of said bar or element.

Suitably rigidly mounted upon the upper end of the support 41 is a primary valve structure 55 comprising, as more clearly shown in Fig. 7, a preferably vertically arranged cylinder or shell 56, the upper end of which is connected by a pipe 56' with a main reservoir 57, included in an air brake system of any well known or preferred type. Disposed within the lower portion of the cylinder 56 is a stationary horizontal partition 58, provided with an upstanding annular valve seat 59, for engagement with an upwardly opening valve 60, there being apertures 61 within the annular valve seat 59, to permit the pressure to pass into an outlet pipe 62 connected with the lower end of the cylinder 56, when the valve 60 is unseated. Connected with the valve 60 is a depending vertical shaft 63, passing outwardly beyond the cylinder 56, through a stuffing box 64, of any well known or preferred type. The lower end of the shaft or rod 63, as more clearly shown in Figs. 4 and 5, is permanently arranged in alinement or in the path of travel of the upper end of the reciprocatory element or bar 44, such element or bar being preferably provided at its upper striking end with an enlarged head 65, as shown.

Pressure operated or pneumatic means are provided to operate the train stopping means, to be described, the same comprising, as more clearly shown in Fig. 3, a relatively stationary preferably vertical cylinder 66, preferably arranged within the cab of the locomotive and rigidly attached to the boiler by any suitable means. Pressure is supplied into the cylinder 66 through the pipe 62, such pipe discharging into the lower end of the cylinder, as shown. The cylinder 66 is provided with a permanently open small exhaust or pin hole port 67, whereby after the pressure has been cut off from the cylinder 66, it will gradually exhaust therefrom. Mounted to reciprocate within the cylinder 66 is a piston 68, connected with an upwardly extending rod 69.

The numeral 70 designates as a whole, electrically operated means, rendering the pressure operated or pneumatic means operative and inoperative with respect to operating the train stopping means, to be described. These electrically operated means, as more clearly shown in Figs. 9 and 10, comprise a stationary casing 71, preferably arranged within the cab of the locomotive, and held stationary by any suitable means. Fixed to the floor or bottom of the casing 71 are spaced upstanding arms or bearings 72, apertured for receiving a horizontal shaft 73. Pivotally mounted upon this horizontal shaft 73 is an inner sleeve or tubular element 74, having a laterally extending crank 75, rigidly connected and preferably formed integral therewith. This crank has its outer end pivotally connected with the upper end of the piston rod 69, as shown at 76. Pivotally mounted upon the inner sleeve 74 is an outer sleeve or tubular element 77, having an opening 78 formed therethrough, for receiving a depending bolt 79. This bolt is adapted for movement into and out of a curved opening or groove 80, formed in the inner sleeve 74, and when within this groove, the same serves to lock the sleeves 74 and 77 together, whereby a turning movement of the sleeve 74 will effect a corresponding turning movement of the sleeve 77, but when the bolt 79 is withdrawn from the groove 80, the sleeve 74 is free to turn without effecting a corresponding movement of the sleeve 77. Rigidly connected and preferably cast integral with the sleeve 77 is an upwardly extending electro-magnet support or arm 81, upon which is rigidly mounted a vertically arranged electro-magnet 82, preferably inclosed within a nonmagnetic casing. The electro-magnet 82, when energized, swings its armature 83 upwardly, such armature having the bolt 79 rigidly attached thereto. The armature 83 has one end thereof pivoted with a knuckle 84, rigidly attached to the support 81. It is thus seen when the electro-magnet 82 is deënergized, the sleeves 74 and 77 will be locked, to move together, but when the electro-magnet is energized, the turning movement of the sleeves 74 will not be transmitted to the sleeve 77. Connected with one end of the winding of the electro-magnet 82 is a wire 82', connected with the contact 49, while the other end of the winding is connected with a wire 83', grounded to the frame of the locomotive. The construction of this electrically operated means is identical with the electrically operated means shown in my copending application Serial No. 747,498, filed Feb. 10, 1913, wherein the same is fully illustrated and claimed, in view of which it is thought that no further showing of the same is necessary in this application, such means not being claimed in this application *per se*.

Preferably arranged within the casing 71 is a secondary valve structure 85, as clearly shown in Figs. 3 and 9. This valve structure may be of any well known or preferred type, the same being connected with a pressure supply pipe 86, receiving pressure from the main reservoir 57 or from the train line, if desired. The valve structure 85 is actuated by a crank 87, to the free end of which is pivoted a link 88, having connection with the knuckle 84. The outlet end of the valve structure 85 is connected with a pipe 89. When the electro-magnet 82 is in its normal or inactive position, the valve structure 85 serves to cut off the supply of pressure to the pipe 89, such pressure being supplied thereto when the electro-magnet is swung toward the rear end of the locomotive, as is obvious.

Attention is now called more particularly to Figs. 11 and 12, wherein the throttle lever operating means is shown, the same comprising a swinging cylinder 90 pivotally attached to the face of the boiler by brackets 91. The pipe 89 leads into the intake end of the cylinder 90, said cylinder being provided with a small or pin hole exhaust port 92, whereby after the supply of pressure to the cylinder 90 has been cut off, the same will gradually exhaust therefrom. Mounted to reciprocate within the cylinder 90 is a piston 93, connected with a piston rod 94, which extends outwardly beyond the cylinder 90. This piston rod has its free end suitably pivotally connected, as shown at 95, with one arm of a bell-crank lever 96, pivoted at 97, to a bracket or support 98. The outer arm of the bell-crank lever 96 is pivoted at 99 with a link or element 100, which traverses a throttle lever 101, and is provided with laterally extending lugs or trunnions 102 and 103, which are normally spaced from and out of engagement with the throttle lever, said throttle lever being disposed within the path of travel of the same. The outer end of the link 100 is pivotally connected with one arm of a bell-crank lever 104 pivoted at 105 with the throttle lever. The bell-crank lever 104 is urged in one direction by a retractile coil spring 106. Extending longitudinally of the throttle lever is the usual latch rod 107, serving to operate a latch 108, to engage with a stationary toothed quadrant 109, such latch being forced inwardly toward the quadrant by a spring 110. The rod 107 is connected with the lever 104 by a link or rod 111. The latch rod 107 is connected with a hand grip 112, to be manually operated thereby. Pivotally connected with the throttle lever, as shown at 113, is a link 114, operating the throttle valve, by means of a valve stem 115, with which the same is connected.

Connected with the pipe 89 through the medium of a T coupling 116, is a pipe 117, discharging into the inlet end of a preferably horizontally arranged cylinder 118. The cylinder 118 is provided with a small or pin hole exhaust port 119, whereby pressure contained therein after the supply of the same has been cut off, may gradually exhaust to the atmosphere. Mounted to reciprocate within the cylinder 118 is a piston 120, connected with a piston rod 121. One end of the horizontal cylinder 118 is internally screw-threaded, for engagement with an internally and externally screw-threaded sleeve 122, arranged therein, as shown. Longitudinally movably mounted within the sleeve 122 is a stop-sleeve 123, externally screw-threaded, as shown. This stop-sleeve carries a turning nut or head 124' and a clamping ring 124, to lock the same in adjustment in the desired longitudinal position. The function of the stop-sleeve is to limit the outward movement of the piston 120. As more clearly shown in Figs. 13, 14 and 15, the horizontal cylinder 118 is rigidly secured to a plate 124ª, by a sleeve 125. This plate is rigidly secured to an engineer's air brake valve 126, preferably of the Westinghouse type, although other forms of valves may be used. This valve comprises generally a valve which is turned or shifted by a valve rod 126', having a lever or crank 127 secured thereto, for turning the same. The plate 124ª is bolted or otherwise secured to a casting 127', rigidly secured to the valve. This casting (see Fig. 15) comprises a horizontal tubular guide 128, receiving a reciprocatory rack-bar 129. The teeth of this rack-bar engage a shifting element or pinion 130, loosely mounted upon the valve rod 126, below the plate 124. This pinion has a cut-out portion 131, to receive the lever 127, and a crank 132, formed integral therewith to engage and move the lever 127, for applying the brakes. The crank 132 permanently engages lever 127 when it is in the normal position, but this lever may be freely manually moved, to apply the brakes, due to the size of the opening 131, as shown. It is therefore obvious that when pressure is introduced into the cylinder 118, the piston and piston rod 121 are moved outwardly, the piston rod 121 engaging a crank 133 formed upon the rack-bar 129. This moves the rack-bar in the direction to turn the pinion 130, to shift the lever 127 and apply the brakes.

The operation of the apparatus is as follows:

In accordance with the illustration in Fig. 1, it is assumed that block D is occupied by a train, whereby the semaphore paddle guarding block D is at danger or stop, the semaphore paddle guarding block C at caution, and the semaphore paddle guarding block B at clear. Assuming that a locomotive or train is traveling from block A into block B, then when the same moves into proximity to the ramp 24 near the entrance end of block B, the contact 49 engages with the ramp-section 25. The shoe and reciprocatory element or bar 44 are thus gradually elevated. Prior to this movement of the reciprocatory element or bar 44, a circuit is closed for energizing the electro-magnet 82, whereby the bolt 79 is withdrawn from the groove 80 and the sleeves 74 and 77 unlocked, the turning movement of the sleeve 74 not being transmitted to the sleeve 77. In the absence of a locomotive or vehicle within the block B, such block being clear, there is a closed track-block circuit including the electro-magnet 21, whereby the contact-armature 32 engages the contact point 31. In the closed track circuit for energizing the magnet 21, current flows from one pole of the source of current 18, through wire 20, traffic rail 16 of the block B, wire 23, electro-magnet 21, wire 22, traffic rail 15 and through wire 19 back to the opposite pole of the source of current. The contact-armature 32 engaging the contact point 31 and the contact segment 44' engaging stationary contact 45' (in block B), a circuit is closed for energizing the electro-magnet 34, whereby contact-armature 32 engages contact point 31 and the ramp-section 25 is electrically connected with the source of current 28. In the closed circuit for energizing the electro-magnet 34, current flows from one pole of the source of current 37, through wire 38, contact 39, contact-armature 40, wire 42', pivot contact 43', contact segment 44', contact 45', wire 36', magnet 34, and wire 35 back to the opposite pole of the source of current 37. In the closed circuit for energizing the electro-magnet 82 upon engagement of contact 49 with the ramp-section 25, current flows from one pole of the source of current 28 adjacent the entrance end of block B, through a portion of the wire 29, wire 30, contact point 31, contact armature 32, wire 33, ramp-section 25, contact 49, wire 82', through electro-magnet 82, wire 83', the frame work of the engine, the traffic rail 15 in block A, and through wire 28ª back to the opposite pole of the source of current. Upon the upward movement of the element or bar 44 the upper end thereof engages the lower end of the valve rod 63, unseating it, whereby the pressure operated or pneumatic means is set into action. Pressure now passes from the main reservoir 57, into the cylinder 56, and through pipe 62 into the cylinder 66. The piston 68 therein is accordingly elevated, which through the medium of piston rod 69, swings crank 75 upwardly. This swinging movement of the crank, the electro-magnet being energized, will not effect a swinging movement of said electro-magnet, whereby the secondary valve structure 85 will not be operated or rendered inactive for supplying pressure to the train stopping means. The circuit for energizing the electro-magnet 82 remains closed until the contact 49 engages the insulation 27, when such circuit is opened, a second circuit however being closed to energize the electromagnet 82 when the contact and shoe engage the ramp-section 26. In this last named closed circuit current flows from one pole of the source of current 28 through wire 29, ramp-section 26, contact 49, lead wire 82', electro-magnet 82, wire 83', the frame work of the locomotive, traffic rail 15, of the block A, and wire 28ª back to the opposite pole of the source of current 28. The function of having the ramp-section 26 permanently connected with the source of current 28 as above stated, is to provide means whereby the train stopping means will not be actuated when the locomotive travels in an opposite direction to the direction of traffic, as when backing, it being disadvantageous for the train stopping means to operate under those conditions. The locomotive or train is thus allowed to pass from block A into block B, without the train stopping means being actuated.

When the locomotive or train traveling in block B approaches the entrance end of the block C, which is at caution condition, the contact 47 and shoe 45 will engage ramp-section 25 guarding the entrance end of block C. As the semaphore paddle 46' occupies the intermediate position, the contact-segment 44' engages contact 45', whereby ramp-section 25 is electrically connected with one pole of the source of current 28. The circuit for energizing the magnet 82 is closed, such circuit remaining closed until the contact and shoe engage the insulation 27 at which time the circuit is opened as above explained. The second circuit for energizing the electro-magnet 82 is closed when the contact 49 engages the ramp-section 26 guarding the entrance end of the block B, as above explained. It is thus seen that the locomotive or train is allowed to pass from the block B into the block C without the train stopping means being actuated.

When the locomotive or train moves into proximity to the entrance end of the block D, which is at danger condition, the contact 49 engages the ramp-section 25 guarding the entrance end of the block D. As this block is at danger condition, the semaphore paddle 46' occupies the lowermost position and the contact segment 44' is moved out of engagement with the contact 45', whereby the ramp-section 25 has no electrical connection with the source of current 28. The electrical connection between the ramp-section 25 and the source of current 28 is now broken at the point 31, the electro-magnet 34 being deenergized. The circuit connected with the electro-magnet 34 is open at two points, to wit, at the contact point 39, the electro-magnet 21 being deënergized by the presence of the locomotive in the block D, and at the contact 45', the contact segment being swung downwardly out of engagement with the same by the movement of the semaphore paddle 46' to the lowermost position. The longitudinal movement of the contact 49 along the ramp-section 25 causes the upward movement of the element or bar 44 whereby the valve 60 is unseated and pressure supplied into the cylinder 66 as above explained. The piston 68 now moves upwardly, swinging the crank 75 upwardly, and turning the sleeve 74 in the same direction. The electromagnet 82 being now deënergized, the bolt 79 will lock the sleeves 74 and 77 together whereby they turn in the same direction. The electro-magnet 82 is thus swung toward the rear end of the cab whereby the same through the medium of the link 88, will actuate the valve structure 85. Upon the valve structure 85 being actuated or rendered active, pressure passes through the pipe 86 into pipe 89. This pressure passes through pipe 89 to the intake end of the cylinder 90, forcing the piston 93 inwardly, whereby the bell-crank lever 96 is swung inwardly. This movement of the bell-crank lever 96 draws the link 100 inwardly, the same first effecting a slight movement of the bell-crank lever 104, to disengage the latch 108, further movement of the link 100 bringing the lug or trunnion 103 into engagement with the throttle lever 101 whereby the same is moved to its closed or inner position. The pressure within the pipe 89 also passes through pipe 117, into the cylinder 118, forcing the piston 120 forwardly, which through the medium of piston rod 121 swings the engineer's brake valve 127 to the service position, for applying the brakes. In practice, I have found it advantageous to apply the brakes a little before cutting off the steam. When the contact 49 engages the ramp-section 26, guarding the entrance end of the block D, the circuit for energizing the electro-magnet 82 is again closed, whereby the train stopping means will not be actuated by the movement of the locomotive or train in a reverse direction.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim is:—

1. In a train control system, a vehicle, pressure operated means mounted upon the vehicle, a source of pressure, a primary valve structure to control the passage of the pressure from the source of pressure to the pressure operated means, mechanically operated means to operate the primary valve structure, a ramp disposed in the path of travel of the mechanically operated means to effect its movement, a secondary valve structure, electrically controlled means moved by the pressure operated means and connected with and adapted to positively operate the secondary valve structure to open it, and pressure operated vehicle stopping means set into operation when the secondary valve structure is open.

2. In a train control system, a track, a vehicle to travel thereon, pressure operated means mounted upon the vehicle, a source of pressure, means of communication between the pressure operated means and the source of pressure having a primary valve connected therein, mechanically operated means to actuate the primary valve, a secondary valve having means of communication with the source of pressure, electrically controlled means adapted when deënergized to be moved by the pressure operated means and having connection with the secondary valve to operate the same, and pressure operated vehicle stopping means connected with the secondary valve to be set into action when the same is opened.

3. In a train control system, a track, a vehicle to travel thereon, a device carried by the vehicle and comprising a plurality of relatively movable members, electrically operated means adapted when deënergized to lock the relatively movable members together for movement together in one direction, pressure operated means to move the device, mechanically actuated means for supplying pressure to the pressure operated means, a ramp arranged in the path of travel of the mechanically actuated means to operate it, pressure operated means to control the movement of the vehicle, and a control device connected with the last named pressure operated means and connected with the first named device.

4. In a train control system, a track, a vehicle to travel thereon, a movable device carried by the vehicle and comprising a plurality of relatively movable parts, means to lock and unlock said relatively movable parts, a cylinder mounted upon the vehicle, a piston mounted within the cylinder, means connecting the piston and one relatively movable part of the device, a conduit for supplying pressure to the cylinder, a primary valve connected with the conduit, mechanically operated means to actuate the primary valve, a ramp arranged in the path of travel of the mechanically operated means, and train stopping means connected with the other relatively movable member and adapted to be actuated thereby.

5. In a train control system, a track, a vehicle to travel thereon, pressure operated vehicle stopping means mounted upon the vehicle, a pressure supply conduit connected with the vehicle stopping means, a valve connected in the conduit to control the passage of pressure therethrough, electrically controlled apparatus adapted when deënergized to actuate the valve, pressure operated means to operate the electrically controlled apparatus when the same is deënergized, and mechanically operated means to actuate the last named pressure operated means.

6. In a train control system, a track, a vehicle to travel thereon, pressure operated throttle lever closing means mounted upon the vehicle, a pressure supply conduit connected with the pressure operated means, a control valve connected in the conduit, electrically controlled apparatus adapted when deënergized and mechanically operated to actuate the control valve, pressure operated apparatus connected with the electrically controlled apparatus to mechanically operate the same, and means to supply pressure to the pressure operated apparatus embodying a primary valve, a shoe having means to operate the primary valve, and a ramp to engage with and move the shoe.

7. In a train control system, a track, a vehicle to travel thereon, pressure operated brake valve actuating means mounted upon the vehicle, a pressure supply conduit connected with the pressure operated means, a control valve connected in the conduit, electrically controlled apparatus adapted when deënergized and mechanically operated to actuate the control valve, pressure operated apparatus connected with the electrically controlled apparatus to mechanically operate the same, and means to supply pressure to the pressure operated apparatus embodying a primary valve, a shoe having means to operate the primary valve and a ramp to engage with and move the shoe.

8. In a train control system, a track, a vehicle to travel thereon, a pressure supply tank, a shell having means of communication with the pressure supply tank and having an upwardly opening valve arranged therein to open against pressure within the shell, a valve stem connected with the valve and extending downwardly below the shell, a reciprocatory shoe carrying member connected with the vehicle and having its upper end arranged to engage with the valve stem, a ramp to engage and move the shoe, pressure operated and electrically controlled apparatus carried by the vehicle to stop the same, and a conduit connecting the apparatus with the shell.

9. In a train control system, the combination with an air brake valve embodying a stem and lever connected therewith to turn the same, of a pinion loosely mounted upon the stem and provided upon one side with a recess to receive the lever, a reciprocatory rack-bar engaging the pinion and carrying an upstanding crank, a cylinder arranged near and above the rack-bar, a piston mounted to reciprocate within the cylinder, a piston rod connected with the piston and adapted to engage the upstanding crank, and means to supply pressure to the cylinder.

10. In a train control system, a track, a vehicle to travel thereon, a source of pressure carried by the vehicle, pressure operated apparatus carried by the vehicle, a conduit connecting the pressure operated apparatus with the source of pressure, a primary valve connected in the conduit, a reciprocatory bar adapted to operate the primary valve and carrying a shoe, a ramp disposed in the path of travel of the shoe to move it, electrically controlled apparatus adapted when deënergized to be operated by the pressure operated apparatus, means electrically connecting the electrically controlled apparatus with the shoe, means for connecting and disconnecting the ramp with and from a source of current, pressure operated train stopping means, a conduit connecting the pressure operated train stopping means and the source of pressure, and a valve connected in the last named conduit and moved with the electrically controlled means to be operated thereby.

11. In a train control system, a pair of relatively movable members, pressure operated apparatus connected with one member to move it, mechanically operated means to supply pressure to the pressure operated apparatus, electrically operated means for connecting and disconnecting the relatively movable members, and train stopping means connected with one member to be operated thereby.

In testimony whereof I affix my signature in presence of two witnesses.

WILLIAM B. MURRAY.

Witnesses:
J. A. FOSTER,
J. ROSS WEBTZ.